United States Patent
Shah et al.

(10) Patent No.: US 7,085,774 B2
(45) Date of Patent: Aug. 1, 2006

(54) ACTIVE PROFILING SYSTEM FOR TRACKING AND QUANTIFYING CUSTOMER CONVERSION EFFICIENCY

(75) Inventors: Safwan Shah, San Jose, CA (US); Vali Maskatiya, Atherton, CA (US); Ashim Banerjee, Westminster, CO (US)

(73) Assignee: Infonox On The Web, Santa Clara, CA (US)

( * ) Notice: Subject to any disclaimer, the term of this patent is extended or adjusted under 35 U.S.C. 154(b) by 536 days.

(21) Appl. No.: 09/944,626

(22) Filed: Aug. 30, 2001

(65) Prior Publication Data

US 2003/0046096 A1    Mar. 6, 2003

(51) Int. Cl.
*G06F 17/30*    (2006.01)

(52) U.S. Cl. .................. 707/104.1; 707/100; 707/101; 707/102

(58) Field of Classification Search ......... 707/1–104.1; 705/14, 26, 43; 235/383
See application file for complete search history.

(56) References Cited

U.S. PATENT DOCUMENTS

| | | | |
|---|---|---|---|
| 5,710,833 A | 1/1998 | Moghaddam et al. | 382/228 |
| 5,764,789 A | 6/1998 | Pare, Jr. et al. | |
| 5,771,307 A | 6/1998 | Lu et al. | 382/116 |
| 5,790,668 A | 8/1998 | Tomko | |
| RE36,041 E | 1/1999 | Turk et al. | 382/118 |
| 6,104,922 A | 8/2000 | Baumann | |
| 6,119,933 A * | 9/2000 | Wong et al. | 235/380 |
| 6,129,274 A * | 10/2000 | Suzuki | 705/16 |
| 6,181,836 B1 | 1/2001 | Delean | 382/302 |
| 6,222,914 B1 | 4/2001 | McMullin | 379/144 |
| 6,236,975 B1 | 5/2001 | Doe et al. | 705/7 |
| 6,327,573 B1 * | 12/2001 | Walker et al. | 705/14 |
| 6,424,249 B1 | 7/2002 | Houvener | |
| 6,513,015 B1 * | 1/2003 | Ogasawara | 705/26 |
| 6,522,772 B1 * | 2/2003 | Morrison et al. | 705/23 |
| 6,601,759 B1 * | 8/2003 | Fife et al. | 705/41 |
| 6,609,102 B1 * | 8/2003 | Kolls | 705/14 |
| 6,837,436 B1 * | 1/2005 | Swartz et al. | 235/472.02 |
| 2001/0014868 A1 * | 8/2001 | Herz et al. | 705/14 |
| 2002/0015176 A1 * | 2/2002 | Takao et al. | 358/1.15 |
| 2002/0016740 A1 * | 2/2002 | Ogasawara | 705/26 |
| 2002/0116265 A1 * | 8/2002 | Hernandez | 705/14 |
| 2002/0152123 A1 * | 10/2002 | Giordano et al. | 705/14 |
| 2002/0165771 A1 * | 11/2002 | Walker et al. | 705/14 |

(Continued)

FOREIGN PATENT DOCUMENTS

EP    0 961 251 A2    4/1999

(Continued)

OTHER PUBLICATIONS

U.S. Appl. No. 09/871,996, filed May 31, 2001, Shah et al.

(Continued)

*Primary Examiner*—Frantz Coby
(74) *Attorney, Agent, or Firm*—Townsend and Townsend and Crew LLP

(57) ABSTRACT

A method and system are provided for compiling a customer profile. A database that includes identification information for customers is maintained. Customers who physically visit a first entity are identified from the information maintained in the database. Some of those customers execute a transaction with the first entity and some of those customers do not execute a transaction with the first entity.

37 Claims, 6 Drawing Sheets

U.S. PATENT DOCUMENTS

| | | | |
|---|---|---|---|
| 2003/0018522 A1* | 1/2003 | Denimarck et al. | 705/14 |
| 2003/0132298 A1* | 7/2003 | Swartz et al. | 235/472.02 |
| 2003/0195811 A1* | 10/2003 | Hayes et al. | 705/26 |
| 2003/0225630 A1* | 12/2003 | Kakuta | 705/26 |
| 2004/0002897 A1* | 1/2004 | Vishik | 705/14 |
| 2004/0026500 A1* | 2/2004 | Brikho | 235/379 |
| 2005/0038747 A1* | 2/2005 | Drummond et al. | 705/43 |
| 2005/0040230 A1* | 2/2005 | Swartz et al. | 235/383 |

FOREIGN PATENT DOCUMENTS

| | | |
|---|---|---|
| GB | 2 366 699 A | 9/2000 |
| WO | WO 00/35341 | 6/2000 |

OTHER PUBLICATIONS

U.S. Appl. No. 09/902,074, filed Jul. 9, 2001, Maskatiya et al..

* cited by examiner

ACTIVE PROFILING SYSTEM FOR TRACKING AND QUANTIFYING CUSTOMER CONVERSION EFFICIENCY

BACKGROUND OF THE INVENTION

This invention relates generally to customer analysis. More specifically, the invention relates to a method and system for tracking customer behavior.

It is generally desirable for vendors of goods and/or services to have as clear an understanding as possible of the demographics and behavior of their customers. Such information is useful in identifying behavior trends to evaluate the success of certain products and/or aspects of the environment provided by specific vendors. More generally, it is also desirable for larger establishments that may comprise multiple vendors, such as a shopping mall, to have a similarly clear understanding of the demographics and behavior of customers that visit the larger establishments.

One advantage of the internet as a means for providing goods and services is that customer movement may be tracked with relative ease. For example, customer profiles may be compiled by observing and recording the behaviors and preferences of individual customers as they navigate through the world wide web. In addition, it is possible to record each financial transaction that was actually consummated, making it possible to calculate a conversion efficiency. In the context of internet transactions, the conversion efficiency may be calculated as the number of clicks per financial transaction for a particular e-commerce site. This conversion efficiency effectively quantifies the attractiveness of a given site for consumers and is typically on the order of 0.1% for e-commence sites.

In the physical world, it is more difficult to track customer movement and therefore to compile a customer profile. One method that has been tried makes use of a customer loyalty program. With such a program, the customer effectively agrees with a store to provide buying information in exchange for incentive rewards. Typically, the store issues a preferred-customer card to a customer who presents the card to a cashier whenever paying for purchases. The store then collects data that may be used in constructing a customer profile while the customer is rewarded for participation in the program by receiving discounts on certain items.

While this system provides some limited information, the customer profile is nonetheless fragmentary. For example, no information comparable to the conversion efficiency is provided since the customer provides no information if he chooses not to make a purchase; the vendor remains completely unaware that a customer may have chosen to browse in the store but decided not to buy anything. Furthermore, the customer profile provided by a customer loyalty program does not address the problem of tracking customer movement across establishments since individual vendors remain isolated.

There is accordingly a need for a method and system for improved customer tracking.

BRIEF SUMMARY OF THE INVENTION

Thus, embodiments of the invention provide a method and system for compiling a customer profile. A database that includes identification information for a plurality of customers is maintained. Customers who physically visit a first entity are identified from the information maintained in the database. Some of those customers execute a transaction with the first entity and some of those customers do not execute a transaction with the first entity. In one such embodiment, a record is made of which customers do and do not execute a transaction with the first entity. In one embodiment, the customer profile is developed from the database information and from identifying the customers who physically visit the first entity. An external database may also be used in developing the customer profile.

In one embodiment, a customer conversion efficiency is determined from the customer identifications. The customer conversion efficiency may be calculated as a ratio of the number of customers who visit the first entity and execute a transaction to the total number of customers who visit the first entity (whether or not they execute a transaction). In a specific embodiment, the customer conversion efficiency is calculated for only a part of the first entity.

In one embodiment, the customers are identified biometrically, such as by identifying a facial feature or voice pattern. In another embodiment, the customers are identified with a card. Such a card may have been originally issued for a different purpose, such as a credit card, debit card, driver's license, passport, etc. The card may comprise a magnetic stripe or bar code, which is read as part of identifying customers; alternatively, at least a portion of the card may be read optically. In a further embodiment, the customers are identified with a personal identification number (PIN).

In some embodiments, an active layer is interposed between (1) stations used to identify customers and/or execute transactions with customers and (2) organizations that operate the entities. The use of such an active layer may provide an improved customer profile. Thus, customers who physically visit the first entity are identified with a physical station associated with a first organization. Customers who visit a second entity associated with a second organization are also identified from the database information. Some of the customers who visit the second entity execute a transaction with the second entity and some of them do not.

In certain embodiments, customers are enrolled to obtain the identification information. Such enrollment may include extracting a first set of biometric data regarding the customer from a verification instrument and extracting a second set of biometric data directly from a feature of the customer to perform a comparison. Customers may be incentivized to participate and to provide the identification information by further administering a customer loyalty program.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. System Overview

Figure 1:
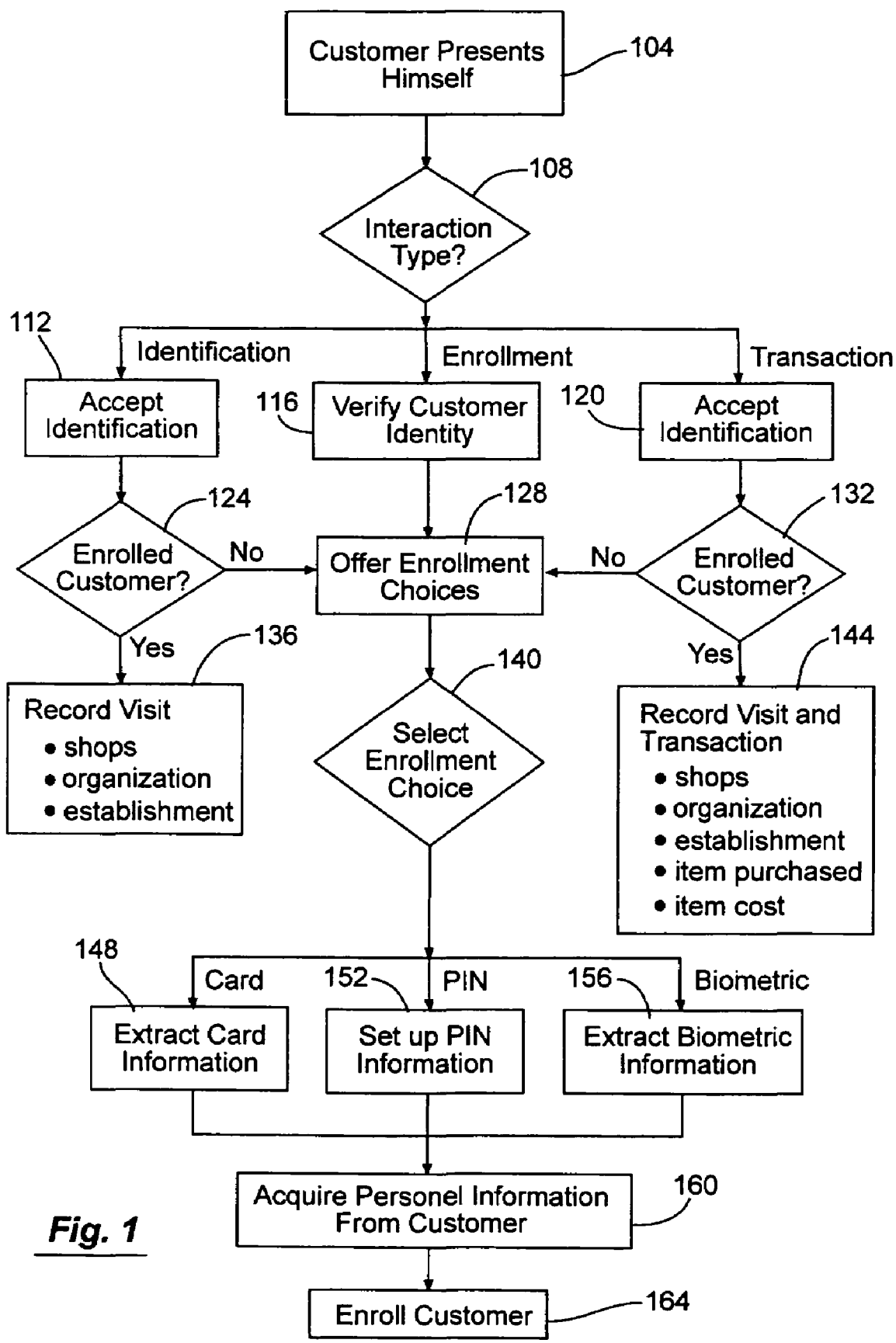
FIG. 1 is a flow diagram illustrating enrollment, identification, and transaction functions that may be performed in accordance with an embodiment of the invention.

Embodiments of the invention are directed to a system and method for compiling a customer profile. An overview of various aspects of the system may be understood with reference to the flow diagram of FIG. 1.

The description of the system makes reference to "shops," "organizations," and "establishments," each of which is intended herein to have a specific meaning. "Shops," "organizations," and "establishments" are sometimes referred to collectively herein as "entities." A "shop" refers generally to a business at a specific location. The specific location may be a physical location or may be a virtual location, such as is provided by the internet. While in some embodiments a shop is organized for the sale of goods, the term is used more generally to refer to any business, including those that offer only services and those that offer a combination of goods and services. Shops may be manned or unmanned. Examples of shops include retail stores, service outlets, casinos, hotels, sports arenas, airline counters at airports, internet web sites, etc. In one particular embodiment, a shop is comprised by a point-of-sale kiosk at which services may be acquired by a customer.

An "organization" refers to a business entity. Most often, the organization will comprise one or more shops, although this is not a necessary requirement. For example, an organization may comprise another organization without comprising any shops. Also, while a shop is generally affiliated with a single organization, in some embodiments a single shop may be affiliated with a plurality of organizations. Affiliation between a shop and an organization may be direct, as when the organization comprises the shop, or may be indirect, as when the organization comprises a hierarchy of organizations, one of which is affiliated directly with the shop.

An "establishment" refers generally to one or more shops and/or organizations that share at least one common business interest. The shops and/or organizations that are comprised by a particular establishment may be located at a common, location (physical or virtual) or may be located at a plurality of locations (physical or virtual). It will thus be understood that any shop or organization by itself qualifies as an establishment.

The example of a typical shopping mall may be used to illustrate how the above terms are used, although this example is intended merely to be illustrative of certain embodiments and not to be limiting. A typical mall includes a number of retail stores, a professional office wing, a food court, a management wing, and perhaps other divisions. It may also include a number of self-service devices, such as automatic teller machines or vending machines, which may be distributed throughout the mall inside or outside of individual retail stores. Each retail store, each food kiosk, each professional office, and each self-service device is a "shop" as used herein. A number of "organizations" may be represented at the mall, some of which may control multiple of the retail stores and some of which may control only an individual store. In some cases, an organization will control other shops that are not affiliated with the mall but are instead located elsewhere. Some of these organizations may offer retail sales over the internet so that their individual web sites also qualify as shops. The mall itself is an establishment since its structure qualifies as a business interest common to the shops and organizations represented. Smaller groupings within the mall may themselves qualify as an establishment, such as the food court, which has multiple kiosks that share the common business interest of selling food at the mall.

In the embodiment of the invention illustrated with FIG. 1, there are three basic types of interaction between the system and a customer that are contemplated: (1) enrollment, in which information is obtained to identify the customer; (2) identification, in which activity of an enrolled customer is noted, whether or not such activity leads to a transaction; and (3) transaction, in which the enrolled customer performs some type of transaction with an entity comprised by the system. In general, interaction between the system and customer proceeds with one or more individual stations, which may be configured specifically for one of the three types of interaction or may be configured for multiple of the types of interaction. In some embodiments, a system device operates automatically, while in other embodiments, it may be operated by a clerk.

Thus, after the customer presents himself at block 104, a determination is made at block 108 as to which type of interaction the customer is to have with the system. The central prong of the flow diagram corresponds to enrollment so that at block 116 the new customer's identity is verified. There are a number of methods that may be used to verify the identity of the customer. In one embodiment, for example, the customer's identity is verified by a clerk who examines photographic identification provided by the customer. The clerk may be physically present with the customer or may be remote, viewing both the customer and the identification with a camera.

Figure 2:
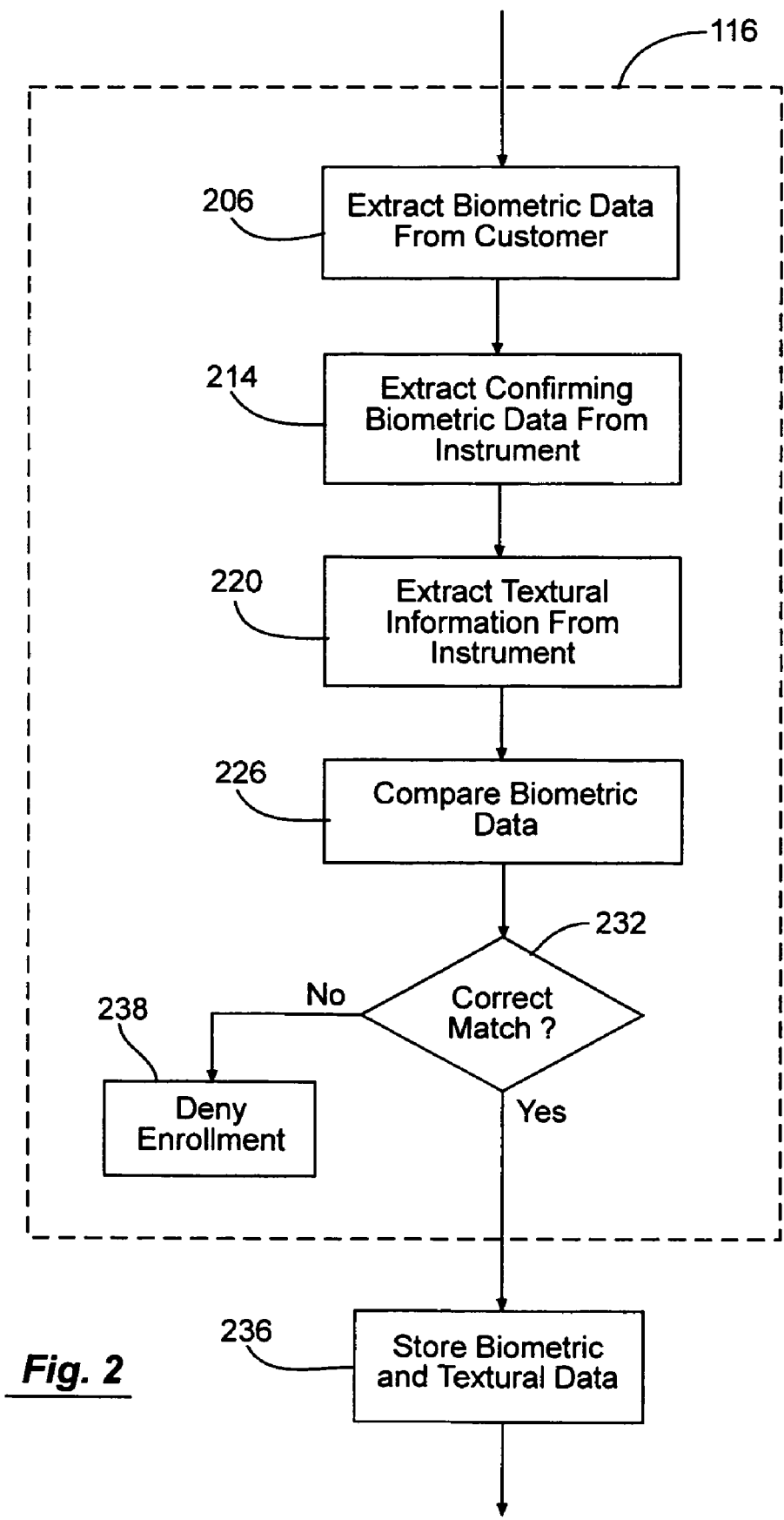
FIG. 2 is a flow diagram illustrating in detail one embodiment for performing customer identity verification as part of an enrollment function.

In another embodiment, the customer's identity may be verified automatically by comparing biometric indices. An overview of such a verification operation is provided in FIG. 2, but is also described in more detail for certain embodiments in the copending, commonly assigned application U.S. patent application Ser. No. 09/902,074, filed Jul. 9, 2001 by Vali Maskatiya et al. and entitled "IDENTITY VERIFICATION AND ENROLLMENT SYSTEM FOR SELF-SERVICE DEVICES" ("the Vali application"), the disclosure of which is herein incorporated by reference in its entirety for all purposes. At block 206, biometric data is extracted from the customer. As used herein, "biometric" data includes any data derived directly from a biological feature of an individual. For example, one particular biometric technique that may be used is described in U.S. Pat. No. 5,710,833, issued to Moghaddam et al. on Jan. 28, 1998 ("the '833 patent"), and which is herein incorporated by reference in its entirety for all purposes. The method described there uses a plurality of eigenvectors derived from an image of facial features to define biometric characteristics.

At block 214, confirming biometric data are extracted from a verification instrument. For example, the verification instrument may be a driver's license or passport, each of which includes a photograph of the customer that may be compared with a direct image of the customer by performing a suitable biometric analysis. Alternatively, the verification instrument may be a resident-alien card or other instrument that includes a fingerprint of the customer that may be compared with a direct image or biometric analysis of the fingerprint. Other types of biometric data that may conceivably be encoded on verification instruments, such as voice patterns, retinal scans, or genetic data, may alternatively be used.

In some embodiments, the verification instrument also includes textual data in some form that is used to identify the customer further. This textual data may be used to increase the reliability that the person enrolled is indeed the individual identified with the verification instrument. As used herein, "textual data" is intended to be interpreted broadly and refers to any data that is not biometric data. Thus, at block 220, textual information is extracted from the verification instrument. How the textual information is extracted may depend on how it is provided on the instrument, and is described in greater detail for different embodiments with respect to FIG. 3 below. At block 226, the two sets of biometric data, i.e. provided directly by the customer and provided by the verification instrument, are compared. For example, in the instance where the biometric technique described in the '833 patent is used, sets of eigenvectors are derived both from scanning the customer's face optically and from scanning the photograph of the customer on the verification instrument. The similarity of these resulting eigenvectors indicates the likelihood that the person in the photograph and the customer who has presented himself are the same.

An evaluation is made at block 232 whether the two biometric measures match to the required degree, for example at the 98% or 95% confidence level. If the match is adequate, the biometric and textual data are stored in a storage device at block 236. In one embodiment, the stored biometric data corresponds to that derived directly from the customer while in another embodiment, the stored biometric data corresponds to that derived from the verification instrument. If the match is not adequate, enrollment of the customer is denied at block 238 on the basis that the customer lacks sufficient verification credentials to complete the enrollment.

Figure 3:
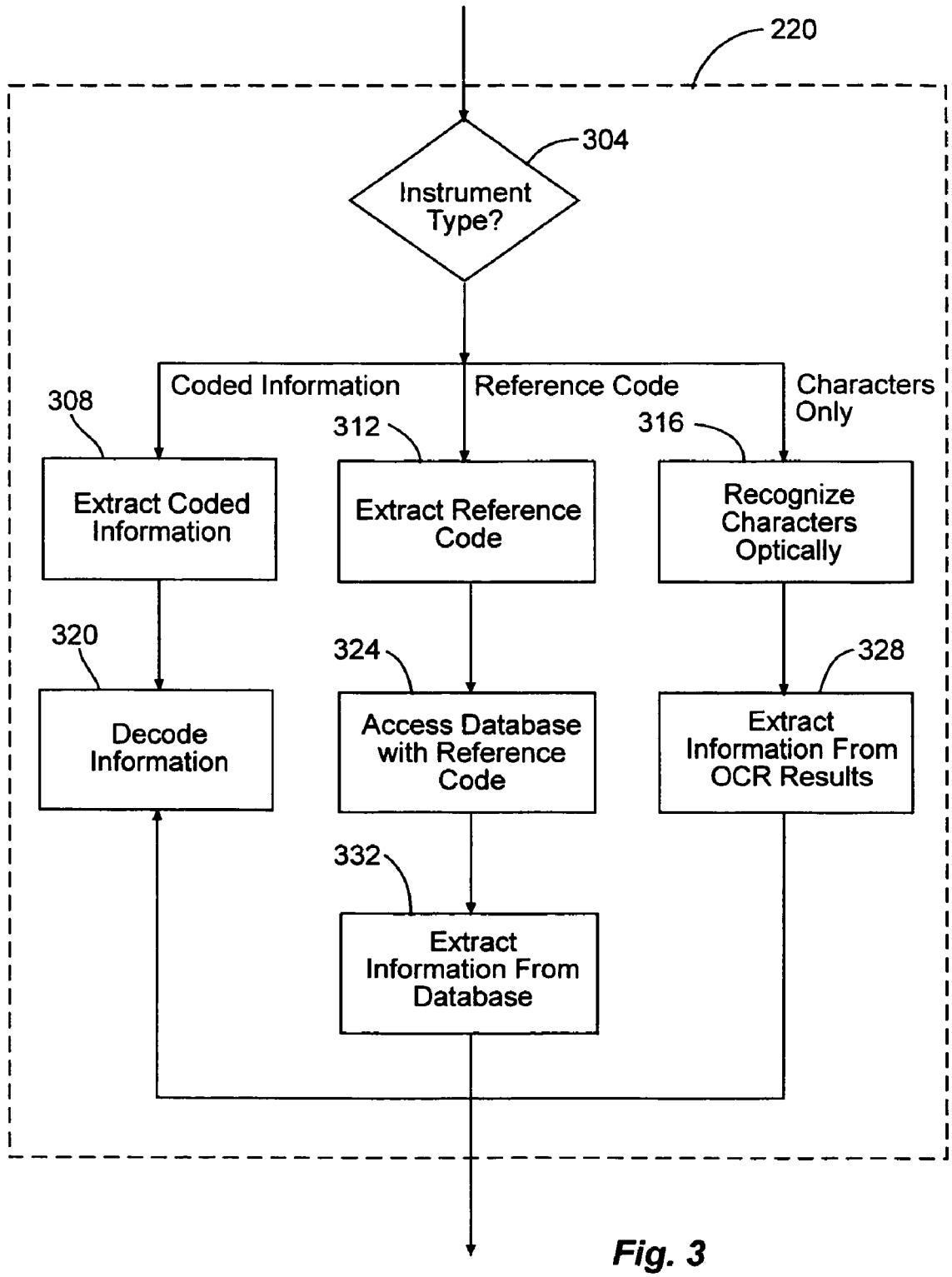
FIG. 3 is a flow diagram illustrating in detail an embodiment for using a verification instrument as part of performing customer identity verification.

FIG. 3 shows a detail of block 220 to illustrate different ways in which textual data may be extracted from the verification instrument depending on how such textual information is provided. The variety in driver's licenses provided within the United States serves as an illustrative example, although it will be understood that this example is described in detail for explanatory purposes and is not intended to be limiting; similar types of textual information are provided on other U.S. and non-U.S. verification instruments. Every U.S. driver's license contains some degree of personal information describing the individual, such as name, address, sex, Social Security number, etc. In some states, a common linear bar code is provided on the rear of the license and provides a number that refers to a government database entry, the database entry including at least the personal information that appears on the license. Linear bar codes are typically configured so that binary-coded decimal information is provided in a pattern of alternating light and dark stripes. In other states, such a reference number is encoded on a magnetic stripe and may be extracted by swiping the card through a magnetic reader. In still other states, no such coded information appears on the driver's license, with the information being presented only in standard human-readable textual form.

It is also possible in some embodiments for the personal information to be encoded directly in a non-human-readable format. For example, where the amount of personal information is not particularly extensive, a magnetic stripe may be sufficient to store all the encoded information directly. A further example of an encoding that stores all of the personal information directly is in the form of a two-dimensional bar-type code; the extra dimension beyond a simple linear bar code permits considerably greater amounts of information to be encoded. An example of a two-dimensional code and suitable optical code reader configured for extracting the information is described, for example, in U.S. Pat. No. 6,181,836, issued to Tetsuya Kannon on Jan. 30, 2001, the entire disclosure of which is herein incorporated by reference for all purposes.

The organization illustrated in FIG. 3 contemplates that the system may be presented with a verification instrument configured in at least any of these ways. Thus, at block 304 the system identifies what type of instrument has been presented, at least with respect to whether any coded information appears on the instrument that may be used to extract the textual data. This may be done directly, by having the system examine the front and/or back of the instrument, or by querying the customer to identify what state issued his driver's license, from which the structure of the instrument will be known. If the information is coded directly on the instrument, such as in the form of a two-dimensional bar-type code or in the form of a magnetic stripe, the system follows the left prong of the flow diagram. At block 308, it extracts the coded information from the instrument, such as by having the customer swipe the instrument through a magnetic reader or by using the device described in U.S. Pat. No. 6,181,836 depending on how the information is encoded. At block 320, the system decodes the extracted information for use as textual data in accordance with embodiments of the invention.

If the instrument contains a reference code, such as may be the case with a linear bar code or magnetic stripe configured only to reference a government database entry, the system follows the central prong of the flow diagram. At block 312, the reference code is extracted by decoding it. Depending on how the reference code is stored, this may be done by having the customer swipe the instrument through a magnetic reader or by examining the bar code optically such as is routinely done for bar-code information in a variety of contexts. At block 324, the relevant government database is accessed, with the decoded reference code being used to access the particular database entry of interest. Information is then extracted directly from that database entry at block 332. In some embodiments, the customer may be prompted to enter data, such as a Social Security Number, that may be compared with the data retrieved from the government database; this adds an additional level of verification to confirm the identity of the customer.

If the system is unable to identify any coded information of any such types on the instrument, the right prong of the flow diagram is followed. On this prong, the system relies on some form of character recognition to extract the desired textual data directly from the printed instrument. In one embodiment, optical character recognition is used at block 316 to identify the characters on the instrument, from which the textual information is extracted directly at block 328.

Returning to the flow diagram of FIG. 1, once the customer's identity has been verified at block 116 as part of the enrollment process, the customer is offered various enrollment choices at block 128. These enrollment choices correspond to different types of identification methods that the customer may choose to use. The system is not restricted to any particular identification method and may be used with any suitable identification method or, as in the illustrated embodiment, with a plurality of identification methods. In this instance, the customer selects one of three identification methods at block 140: (1) the use of a card; (2) the use of a personal identification number ("PIN"); or (3) the use of a biometric.

If the user decides to use a card for identification, information from the chosen card is extracted at block 148. In one embodiment, the card is a preexisting card held by the customer and is not issued specifically for the purpose of enrolling in the system. For example, the preexisting card may be a credit card, debit card, driver's license, or other card that includes identification information. Generally, such a preexisting card will have information in a format similar to those described with respect to FIG. 3. For example, it may have identification information encoded directly on the document, such as in the form of a two-dimensional bar code. Alternatively, it may have a reference code in the form of a linear bar code or magnetic strip, or it may simply have personal information presented optically on the face of the document. In one embodiment, the system is configured to extract the relevant identification information in a fashion similar to that described with respect to FIG. 3. In a specific embodiment, if the user decides to use a card that was also used to verify the customer's identity at block 116, the system may simply use the personal information that was previously stored as part of verifying the customer's identity rather than extracting new information at block 148.

If instead the user elects to use a PIN for identification, one is established at block 152, either by having the user select one or by assigning one to the user.

If the user decides to use biometric information for identification, such biometric information is extracted at block 156. The biometric information may comprise information derived from, among others, facial features, fingerprints, voice patterns, and retinal scans. In a specific embodiment, if biometric information was used by the system at block 116 in verifying the identity of the customer, the system may simply use that biometric information instead of extracting new biometric information at block 156. There is no requirement, however, that the biometric information extracted at block 156 be the same biometric information that may have been used at block 116.

For any of the identification methods, whether they be one of the three explicitly described or be an alternative to those, the system proceeds at block 160 to acquire personal information from the customer. Such personal information is intended to be used in order to classify profile data as it is accumulated and may therefore comprise, for example, demographic information not readily available from any instruments that have been examined by the system up to this point. Examples of such demographic information include income level, education level, residence location, age, profession, etc. After acquiring the desired personal information, the customer is enrolled at block 164.

Once the customer is enrolled, the system is prepared to monitor activities of the customer, thereby developing a profile of customers, in exchange for providing rewards to the customer. In particular, the customer is asked to present himself for identification whenever he visits a participating shop or establishment, regardless of whether he executes a transaction there. Appropriate devices that permit identification of the customer according to the method chosen by the customer for identification are positioned at entrances to shops or establishments. Where the customer is to be identified with a card, he simply presents the card whenever he enters one of the shops or establishments. Where he is to be identified with a PIN, he enters the PIN whenever he enters one of the shops or establishments. Similarly, where he is to be identified with biometric data, he presents himself for biometric scanning whenever entering one of the shops or establishments.

Typically, the customer will be rewarded for allowing his identification each time he enters a shop or establishment. For example, in one embodiment, the customer may accumulate points, each and every time he enters a shop or establishment, that may be used for the purchase of goods. A reward system structured in accordance with such an embodiment may be presented and marketed to customers, for example, as providing a reward simply for visiting an organization's stores, without any obligation to execute any transactions to accumulate reward points.

In cases where identification is performed with a biometric, operation of the system may, in addition, be especially unobtrusive for the customer. For example, U.S. Pat. No. 5,771,307, the entire disclosure of which is herein incorporated by reference for all purposes, discloses a method for using biometric information to identify an individual automatically from a group of individuals. Accordingly, in embodiments where identification devices using such a method are positioned at entrances of shops or establishments, the customer need do nothing more than enter the shop or establishment in order to be identified.

Thus, the left prong of FIG. 1 illustrates generally how the system proceeds to identify customers who do not necessary execute transactions. At block 112, the customer's identification when he presents himself at a shop or establishment is accepted. This may be done as is appropriate for the type of identification method used by the customer. Thus, the customer may, for example, present himself at a kiosk with his identification card for magnetic or optical reading, present himself at a kiosk to enter his PIN, or present himself for biometric identification, which may be done without any specific affirmative action on the part of the customer. At block 124, the system checks the identification to determine whether the customer has been previously enrolled. If not, the customer may be offered an opportunity to enroll. If the customer is properly identified as having previously been enrolled, his visit is recorded at block 136. Such recordation will generally specify all relevant shops, organizations, and establishments affiliated with the particular identification for later use in developing a customer profile.

The right prong of FIG. 1 is similar to the left prong, but applies when the customer actually executes a transaction. At block 120, the customer's identification is accepted as appropriate for the type of identification method used by that customer. In instances where the identification method is also used to execute the transaction, such as in the case of a credit or debit card, the acceptance of the identification at block 120 may be performed automatically. At block 132, the system checks the identification to determine whether the customer has been previously enrolled. If not, the customer may be offered an opportunity to enroll with the system. If the customer is properly identified as having previously been enrolled, his transaction is recorded at block 144. In addition to recording all relevant shops, organizations, and establishments affiliated with the particular transaction, details of the transaction are recorded, such as the item purchased and its cost. An "item" is intended to refer generically to both goods and services.

In one embodiment, the identification and transaction information is used to calculate a customer conversion efficiency. The customer conversion efficiency may be defined as the ratio of the number of transactions executed to the number of independent identifications made, thereby giving an indication of what fraction of visits by customers result in transactions. The customer conversion efficiency may be calculated for individual shops, across organizations, or for specific establishments, in different embodiments. Since shops may comprise commercial internet web sites, the customer conversion efficiency may also be computed in different embodiments to compare its value for web-based shops with physical shops or with an aggregate across all shops. Such comparisons may be performed, for example, for all shops comprised by a particular organization or particular establishment. It is generally expected that the customer conversion efficiency for internet-based visits will be substantially different than for physical visits.

2. Active Layer

Embodiments of the invention may also make use of an active layer to obtain more comprehensive customer-profile information. A description of an active layer that may be used with embodiments of the invention is described in detail in copending, commonly assigned U.S. patent application Ser. No. 09/871,996, filed May 31, 2001 by Safwan Shah et al., entitled "ACTIVE TRANSACTION GENERATION, PROCESSING, AND ROUTING SYSTEM," the disclosure of which is herein incorporated by reference in its entirety for all purposes. Briefly, the active layer comprises a functional intermediary between customers and entities so that all customer information derived by the system may be intercepted. This functional intermediary is useful for deriving a more comprehensive customer profile since information is not provided piecemeal by shop or organization.

Figure 4:
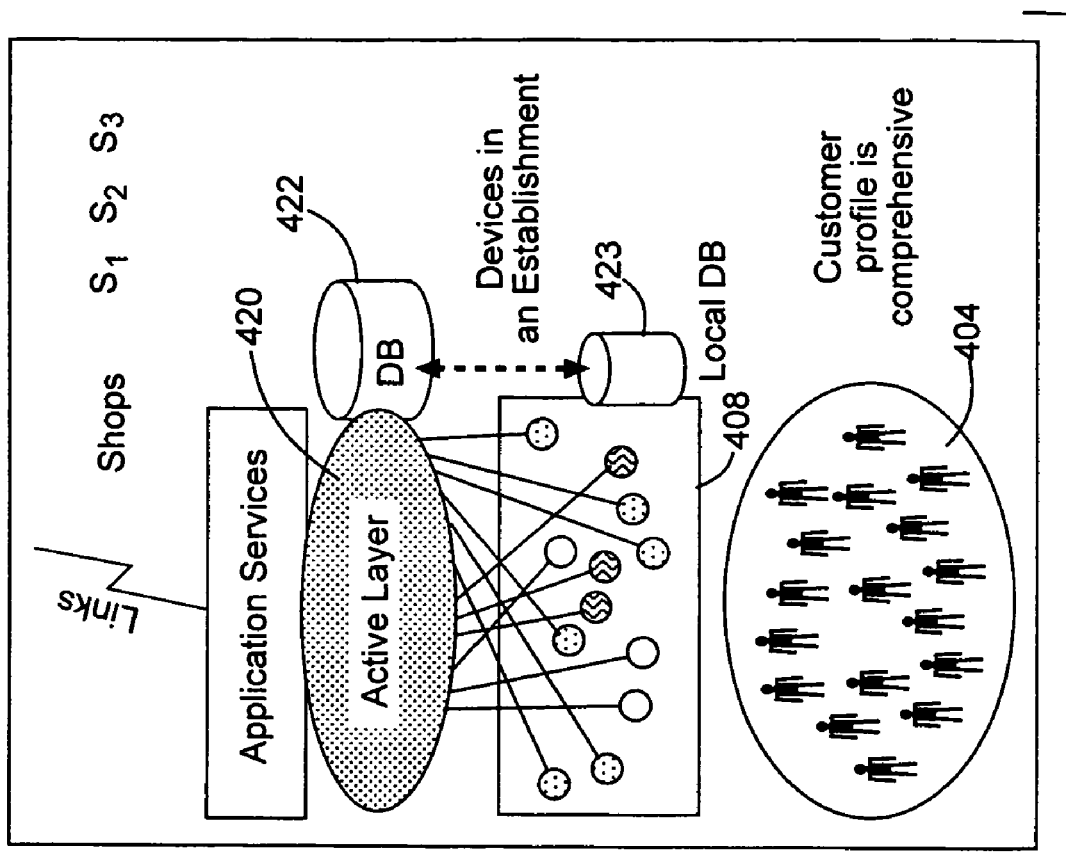
FIG. 4 is a schematic diagram illustrating how a comprehensive customer profile may be developed with use of active layer.
Figure 4:
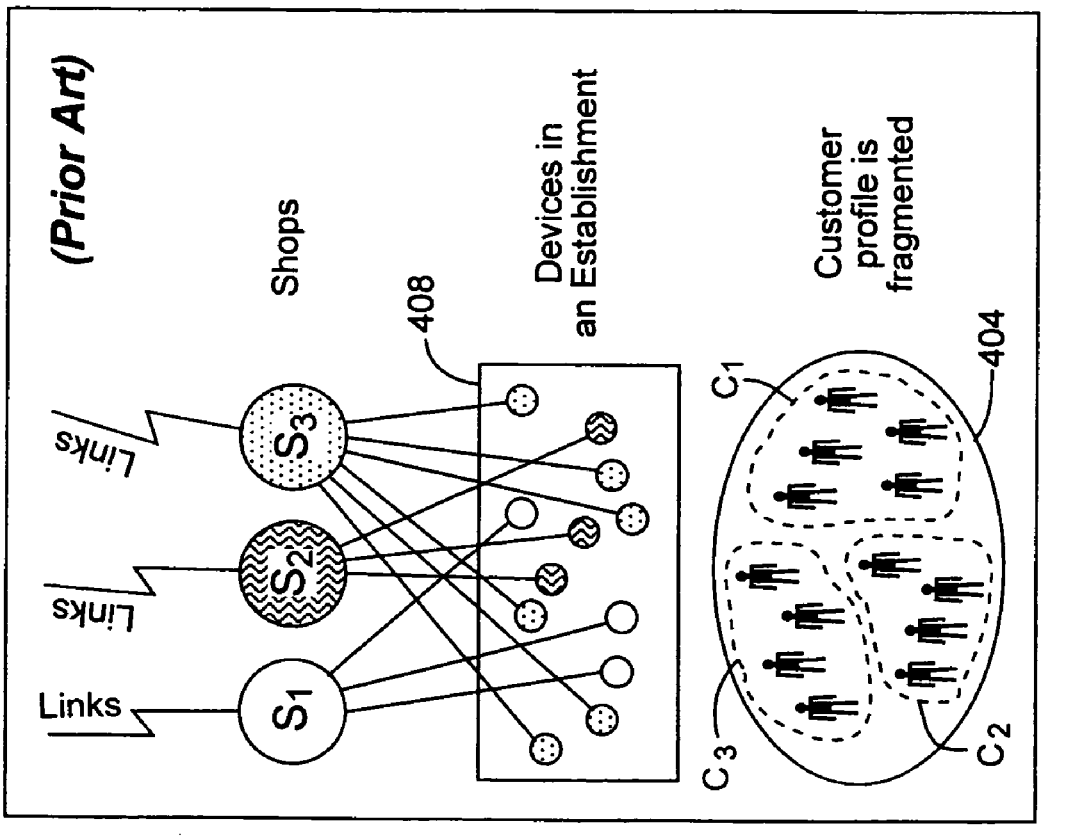

Operation of the active layer may be understood more clearly with reference to FIG. 4, which compares a prior-art arrangement that does not use an active layer (left panel) with a similar system that uses the active layer (right panel). In both cases for this example, an establishment exists that includes a number of devices 408 associated with a plurality of shops $S_1, S_2, S_3, \ldots$. Customers 404 within the establishment may use the devices 408 for enrollment, identification, and to execute transactions as described above. Generally, each of the devices 408 will be associated directly with only one of the shops $S_i$ and the customers may be identified as belonging to subsets $C_1, C_2, C_3, \ldots$, where customers in subset $C_i$ use devices 408 associated with shop $S_i$.

Without the active layer, as shown in the left panel, there is no integration of information among the different customer subsets. Each shop is able to collect and analyze information about the subset of customers that use its devices 408. While this information may be shared among an organization that is affiliated with some of the shops, the information is not readily accessible in a way that provides information comprehensively about customers of the establishment. By contrast, the imposition of the active layer 420 as a functional intermediary between the customers and shops, as shown in the right panel of FIG. 4, provides comprehensive information about customers of the establishment. This is because the active layer 420 is configured so that any device 408 associated with the establishment presents collected information to the active layer 420 for processing. In addition to local databases 423 that may be associated with each of the devices, the active layer includes a master database 422 for storing collected information. The active layer then transmits specific information as needed by the individual shops $S_i$ and/or their respective affiliated organizations.

Because all information collected by individual devices, be they for enrollment, identification, or to execute transactions, and irrespective of their individual shop/organization affiliation, passes through the active layer, it is possible to develop a comprehensive profile of establishment customers. As used herein, a customer "profile" refers broadly to categorizations of customers based on one or more characteristics. Such one or more characteristics may be derived from information provided by customers as part of the enrollment process, such as financial or demographic characteristics, or may be derived from information provided as the result of transactions executed with the system. Thus, the customer profile may be based on characteristics that include the types of shops frequented by certain types of customers and the types of items purchased.

In the example where the establishment is a shopping mall, the active layer 420 may collect information regarding the habits of customers not only on a store-by-store basis, but also in terms of the mall as a whole. Where the establishment further includes commercial web sites for organizations that have stores in the mall, the information may also correlate between those customers that use the web sites in combination with or exclusive of the mall. This information may be used for a variety of purposes, such as to make inventory determinations in individual stores, to determine the types of stores to provide in the mall, to determine which types of advertising to use, etc.

In some embodiments, the active layer 420 is further configured for interaction with one or more external sources of information. For example, the active layer 420 routinely relies on information stored in the master database 422. This information is built up over time by the system to include both current data and an indication of how that data has varied over time. The data may include, without limitation, personal facts about customers, such as those collected through enrollment functions, as well has behavioral facts, such as spending habits and preferred transaction types. In addition to this locally collected data, the active layer 420 may be provided with access to one or more externally maintained databases. Examples of external databases that include information relevant to development of a customer profile include, without limitation: a database that maintains a list of credit cards that have had credit difficulties in the past, such as USA Payments; databases that provide credit histories when furnished with identification information, such as maintained by Experian Information Solutions, Inc.® or Central Credit, Inc.; databases that compile lists of individuals who should be blocked from receiving credit, such as the voluntary service provided by STEP and the involuntary service provided by the Global Cash Access Charge Back System; and postal-code databases, such as the Zone Improvement Plan (ZIP) codes in the United States, that provide information regarding residential location, property value, neighbor behavior etc.

3. Exemplary Structures

Figure 5A:
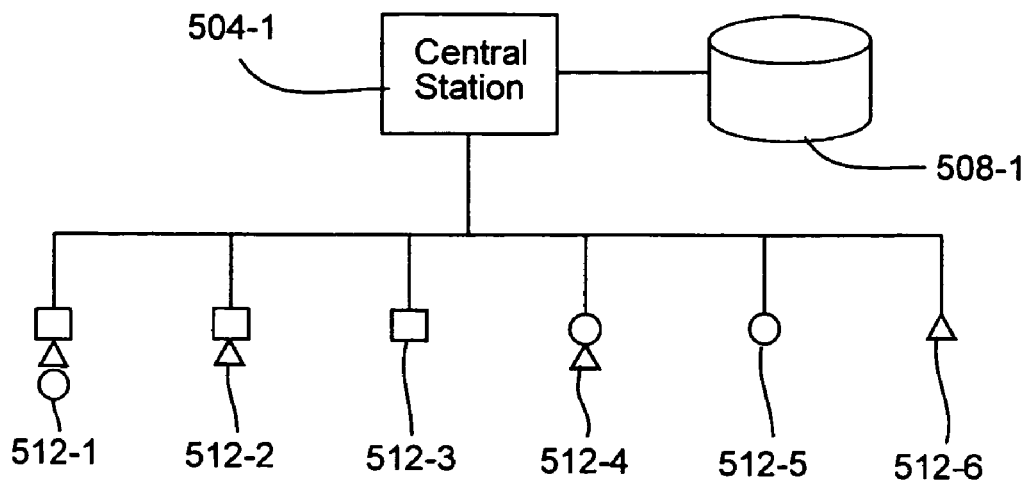
FIGS. 5A–5C show schematically different embodiments configured for developing customer profiles with respect to different entity structures.
Figure 5B:
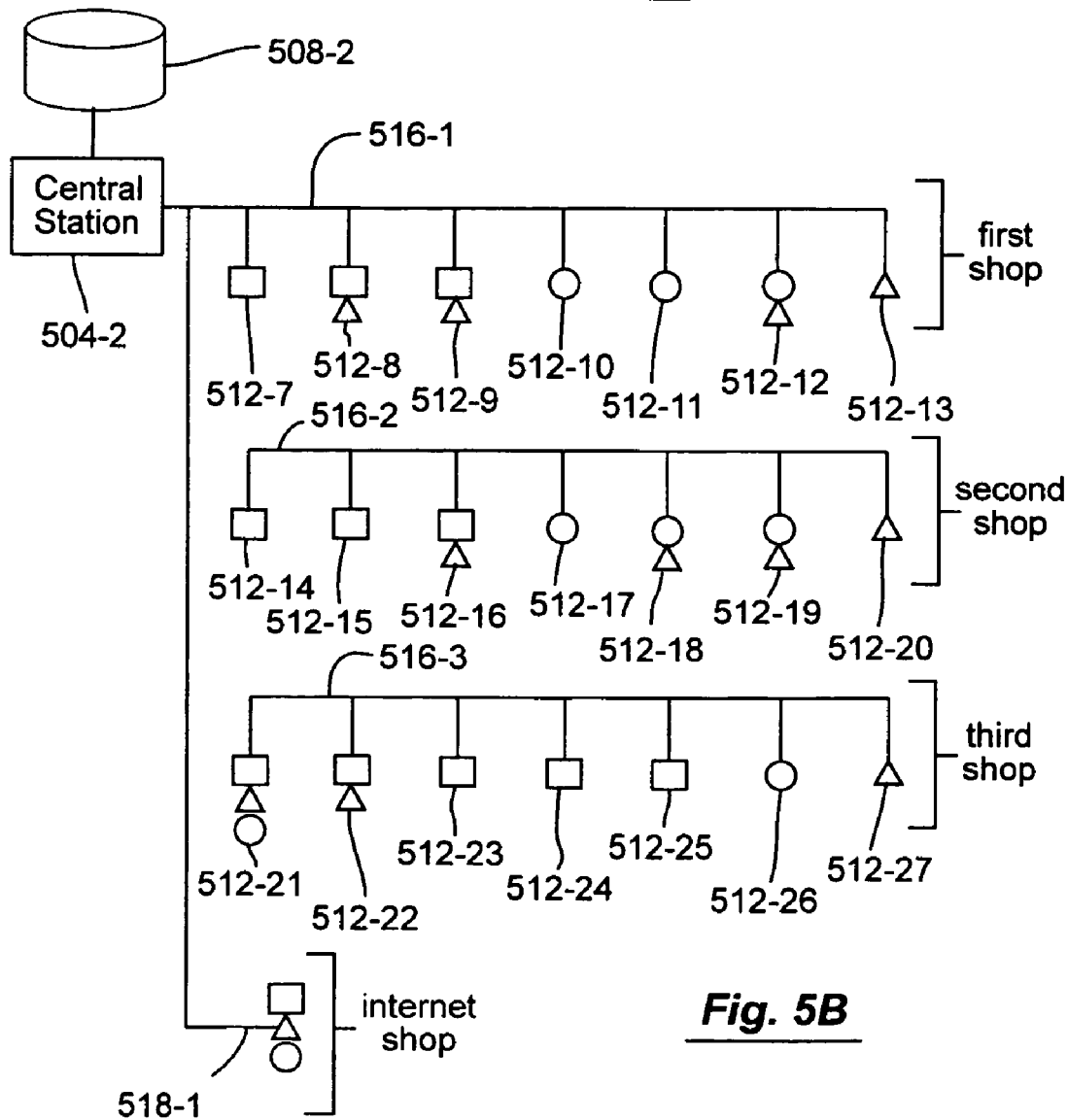
Figure 5C:
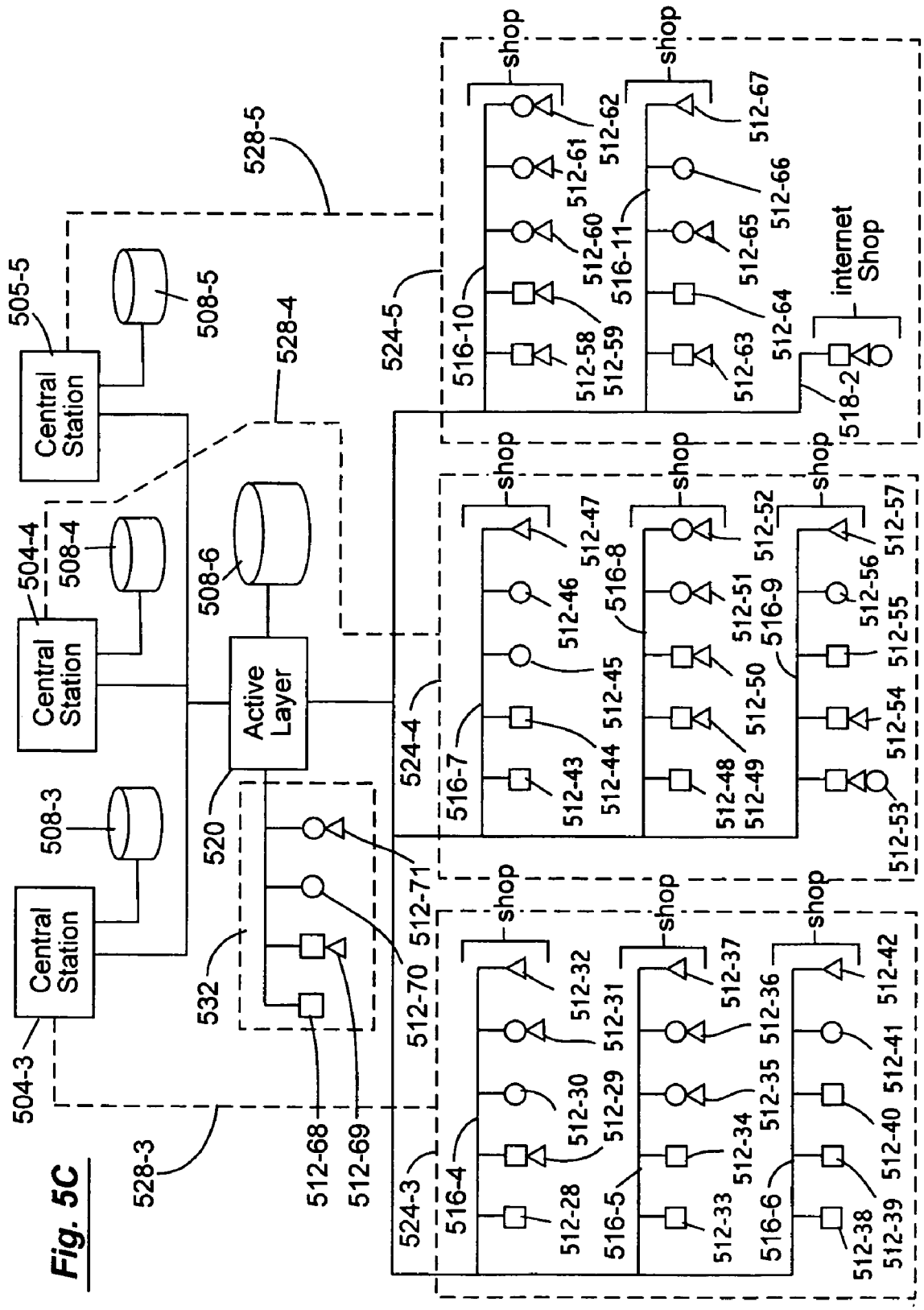

The system may adopt various physical configurations, some of which are illustrated schematically in FIGS. 5A–5C. In general, a central station 504 is configured to be in communication with a number of individual stations 512. The central station is also in communication with a database 508 where information can be stored and from which information can be extracted. The individual stations 512 are distributed among shops, organizations, and establishments and are configured to interact with customers according to one or more of the three interaction types discussed with respect to FIG. 1: enrollment, identification, and transaction. In FIGS. 5A–5C, the diversity of device functions that may be performed by individual stations 512 is shown by using: (1) a square to designate those that perform enrollment functions; (2) a triangle to denote those that perform identification functions; and (3) a circle to denote those that perform transaction functions.

Specific individual stations may be constructed in different ways. For example, some of the devices described in the Vali application, which has been incorporated by reference, are configured to perform all three types of interaction. Certain of the functions of such devices may be removed or disabled in specific instances so that fewer of the types of interaction may be performed.

FIG. 5A illustrates a simple configuration in which the system is adapted for use with a single shop. The central station 504-1 is in communication with database 508-1 and with a plurality of individual stations 512, each of which is shown to be configured for different functions. Some of the individual stations 512 may be standalone stations, such as those that are configured to identify customers who enter the shop, and some may be operated by a clerk, such as those used to perform a transaction. The individual stations may also be distributed as appropriate throughout the shop, with those configured for identification being positioned primarily near shop entrances to track visits by customers. In order to calculate a conversion efficiency for the shop, the total number of transactions by registered customers may be divided by the total number of visits by registered customers to the shop.

FIG. 5B illustrates a slightly more complex configuration that may be useful for an organization to develop a customer profile. In this configuration, the central station 504-2, in addition to being in communication with database 508-2, is in communication with individual stations 512 at a plurality of shops. As shown, the configuration may be used by an organization that comprises three physical shops and one internet shop. The central station 504-2 is in communication with the physical shops through connections 516 and is in communication with the internet shop through internet connection 518. The accumulated identification and transaction data for registered customers may be used to calculate a customer conversion efficiency for each of the shops independently, both for the physical and internet shops, or to calculate an overall customer conversion efficiency. This permits a comparison of the efficiency of each of the shops at inducing customers to execute transactions, allowing the organization to make changes designed to increase the customer conversion efficiency.

FIG. 5C illustrates a still more complex configuration suitable for developing a customer profile of an establishment. The figure shows a plurality of shops that are associated with a plurality of organizations 524. Each organization 524 is in communication with its own central station 504 and database 508 so that an analysis of its own shops may be performed independently. Communication lines between each organization's shops 524 and its central station 504 are shown with dashed lines 528. In addition, however, communication lines between the shops 524 are the central stations 504 are also provided through an active layer 520. The active layer is in communication with its own database 508. With such a configuration, comprehensive information regarding all of the shops and/or organizations 524 comprised by the establishment may be collected and analyzed.

The structure of each organization will generally vary. In the example shown, organizations 524-3 and 524-4 each comprise three physical shops while organization 524-5 comprises two physical shops and one internet shop. In other embodiments, one or more organizations 524 may additionally comprise shops that are not comprised by the establishment. As for the previous configurations of FIGS. 5A and 5B, a customer profile may be developed for each of the shops and/or organizations 524, including a calculation of appropriate customer conversion efficiencies.

This example shows how inclusion of the active layer provides more versatile information. In addition to individual stations 512 that are comprised by organizations 524, the establishment may provide a plurality 532 of individual stations 512 that are affiliated only with the establishment. For example, in the case where the establishment is a mall, some of the plurality 532 may be ATM's or standalone devices configured to enroll or identify customers. Thus, it is possible to derive a customer profile for the establishment as a whole, including a customer conversion efficiency that relates visits to the establishment to transactions performed in any of the shops comprised by the establishment. In one embodiment, a customer conversion efficiency may be calculated for certain types of shops, e.g. clothing stores, even where those shops are affiliated with distinct organizations.

Having described several embodiments, it will be recognized by those of skill in the art that various modifications, alternative constructions, and equivalents may be used without departing from the spirit of the invention. For example, still more complex configurations of shops and organizations, perhaps including multiple establishments, may be used with embodiments of the invention. Accordingly, the above description should not be taken as limiting the scope of the invention, which is defined in the following claims.

What is claimed is:

1. A method for compiling a customer profile, the method comprising:
   maintaining a database that includes identification information for a plurality of customers;
   identifying customers who physically visit a first entity from the database information, wherein some of such customers execute a transaction with the first entity and some of such customers do not execute a transaction with the first entity;
   for each customer who executes a transaction with the first entity, recording particulars of such each customer's visit and particulars of the transaction in the database as part of a record affiliated with an identification of such each customer; and
   for each customer who does not execute a transaction with the first entity, recording particulars of such each customer's visit in the database as part of a record affiliated with an identification of such each customer.

2. The method recited in claim 1 further comprising developing the customer profile from the database information and from identifying the customers who physically visit the first entity.

3. The method recited in claim 2 wherein developing the customer profile comprises accessing an external database.

4. The method recited in claim 1 wherein identifying customers comprises identifying customers biometrically.

5. The method recited in claim 4 wherein identifying customers biometrically comprises identifying a facial feature of customers.

6. The method recited in claim 4 wherein identifying customers biometrically comprises identifying a voice pattern of customers.

7. The method recited in claim 1 wherein identifying customers comprises identifying customers with a card.

8. The method recited in claim 7 wherein the card was not originally issued for identifying customers who physically visit the first entity.

9. The method recited in claim 7 wherein the card comprises a magnetic stripe and wherein identifying customers with the card comprises reading the magnetic stripe.

10. The method recited in claim 7 wherein the card comprises a bar code and wherein identifying customers with the card comprises reading the bar code.

11. The method recited in claim 7 wherein identifying customers with the card comprises optically reading at least a portion of the card.

12. The method recited in claim 1 wherein identifying customers comprises identifying customers with a personal identification number.

13. The method recited in claim 1 wherein identifying customers who physically visit the first entity comprises identifying customers with a physical station associated with a first organization, the method further comprising identifying customers who visit a second entity from the database information, the second entity being associated with a second organization, wherein some of such customers who visit the second entity execute a transaction with the second entity and some of such customers who visit the second entity do not execute a transaction with the second entity.

14. The method recited in claim 13 wherein identifying customers who physically visit the first entity comprises identifying customers biometrically.

15. The method recited in claim 13 further comprising determining a customer conversion efficiency for at least one of the first and second entities.

16. The method recited in claim 13 further comprising determining a customer conversion efficiency for a combination of the first and second entities.

17. The method recited in claim 13 further comprising administering a customer loyalty program to incentivize customers to provide the identification information.

18. The method recited in claim 1 further comprising determining a customer conversion efficiency for the first entity, wherein the customer conversion efficiency comprises a ratio of a number of customers who visit the first entity and execute a transaction with the first entity to a total number of customers who visit the first entity.

19. The method recited in claim 1 further comprising determining a customer conversion efficiency for at least part of the first entity, wherein the customer conversion efficiency comprises a ratio of a number of customers who visit the part of the first entity and execute a transaction with the part of the first entity to a total number of customers who visit the part of the first entity.

20. The method recited in claim 1 further comprising administering a customer loyalty program to incentivize customers to provide the identification information.

21. The method recited in claim 1 wherein the first entity comprises a shop.

22. The method recited in claim 1 wherein the first entity comprises an establishment.

23. The method recited in claim 1 further comprising identifying customers who visit an internet site affiliated with the first entity, wherein some such customers who visit the internet site execute a transaction with the first entity and some of such customers who visit the internet site do not execute a transaction with the first entity.

24. The method recited in claim 1 further comprising enrolling customers to obtain the identification information.

25. The method recited in claim 24 wherein enrolling customers comprises, for each such customer:
extracting a first set of biometric data regarding the customer from a verification instrument;
extracting a second set of biometric data directly from at least one feature of the customer; and
comparing the first and second sets of biometric data to determine whether the first and second sets of biometric data are derived from a single individual.

26. A method for compiling a customer profile, the method comprising:
for each of a plurality of customers, enrolling such customer by:
extracting a first set of biometric data regarding the customer from a verification instrument;
extracting a second set of biometric data directly from at least one feature of the customer; and
comparing the first and second sets of biometric data to determine whether the first and second sets of biometric data are derived from a single individual;
maintaining a database that includes identification information for each of the plurality of customers;
biometrically identifying customers who visit an entity from the database information, wherein some of such customers execute a transaction with the entity and some of such customers do not execute a transaction with the entity;
for each customer who executes a transaction with the entity, recording particulars of such each customer's visit and particulars of the transactions in the database as part of a record affiliated with such each customer;
for each customer who does not execute a transaction with the entity, recording particulars of such each customer's visit in the database as part of a record affiliated with such each customer; and
determining a customer conversion efficiency for the entity, wherein the customer conversion efficiency comprises a ratio of a number of customers who visit the first entity and execute a transaction with the first entity to a total number of customers who visit the first entity.

27. The method recited in claim 26 further comprising administering a customer loyalty program to incentivize customers to provide the identification information.

28. A computer system for compiling a customer profile, the computer system comprising:
a storage device configured to store customer identification information;
at least one communications device configured to permit exchange of data with a plurality of stations; and
a processor in communication with the storage device and the at least one communications device, wherein the processor is configured to:
identify customers who physically visit one of the plurality of stations at a first entity, wherein some of such customers execute a transaction with the first entity and some of such customers do not execute a transaction with the first entity;
for each customer who executes a transaction with the first entity, record particulars of such each customer's visit and particulars of the transaction in the database as part of a record affiliated with an identification of such each customer; and
for each customer who does not execute a transaction with the first entity, record particulars of such each customer's visit in the database as part of a record affiliated with an identification of such each customer.

29. The computer system recited in claim 28 wherein the processor is further configured to develop a customer profile from the database information and from identifying the customers who physically visit the one of the plurality of stations.

30. The computer system recited in claim 29 wherein the customer profile comprises a customer conversion efficiency, wherein the customer conversion efficiency comprises a ratio of a number of customers who visit the first entity and execute a transaction with the first entity to a total number of customers who visit the first entity.

31. The computer system recited in claim 28 wherein the one of the plurality of stations is associated with a first organization and wherein the processor is further configured to identify customers who visit a second of the plurality of stations at a second entity, wherein some of such customers who visit the second of the plurality of stations execute a transaction with the second entity and some of such customers who visit the second of the plurality of stations do not execute a transaction with the second entity.

32. The computer system recited in claim 29 wherein the processor is further in communication with the internet and configured to identify customers who visit an internet site affiliated with the first entity, wherein some such customers who visit the internet site execute a transaction with the first entity and some such customers who visit the internet site do not execute a transaction with the first entity.

33. A computer system for compiling a customer profile, the computer system comprising:
   storage means configured to store customer identification information;
   communication means configured to permit exchange of data with a plurality of stations; and
   processor means in communication with the storage means and the communication means, wherein the processor means is configured to:
      identify customers who physically visit one of the plurality of stations at a first entity, wherein some of such customers execute a transaction with the first entity and some of such customers do not execute a transaction with the first entity;
      for each customer who executes a transaction with the first entity, record particulars of such each customer's visit and particulars of the transaction on the storage means as part of a record affiliated with an identification of such each customer; and
      for each customer who does not execute a transaction with the first entity, record particulars of such each customer's visit on the storage means as part of a record affiliated with an identification of such each customer.

34. The computer system recited in claim 33 wherein the processor means is further configured to develop a customer profile from the database information and from identifying the customers who physically visit the one of the plurality of stations.

35. The computer system recited in claim 34 wherein the customer profile comprises a customer conversion efficiency, wherein the customer conversion efficiency comprises a ratio of a number of customers who visit the first entity and execute a transaction with the first entity to a total number of customers who visit the first entity.

36. The computer system recited in claim 33 wherein the one of the plurality of stations is associated with a first organization and wherein the processor means is further configured to identify customers who visit a second of the plurality of stations at a second entity, wherein some of such customers who visit the second of the plurality of stations do not execute a transaction with the second entity.

37. The computer system recited in claim 33 wherein the processor means is further in communication with the internet and configured to identify customers who visit an internet site affiliated with the first entity, wherein some such customers who visit the internet site execute a transaction with the first entity and some such customers who visit the internet site do not execute a transaction with the first entity.

* * * * *